United States Patent [19]

Fuchigami

[11] 4,354,697

[45] Oct. 19, 1982

[54] PROCESS FOR PRODUCTING P-PHENYLPHENOL RESIN IMPROVED IN SOLUBILITY AND NO CARBON COPYING PAPER COMPRISING THE SAME

[75] Inventor: Mitsuru Fuchigami, Takasago, Japan

[73] Assignee: Mitsubishi Paper Mills, Ltd., Tokyo, Japan

[21] Appl. No.: 158,803

[22] Filed: Jun. 12, 1980

Related U.S. Application Data

[63] Continuation of Ser. No. 799,777, May 23, 1977, abandoned.

[30] Foreign Application Priority Data

Jun. 2, 1976 [JP] Japan ................................. 51/64300

[51] Int. Cl.$^3$ .......................... B41L 1/20; B32B 27/42
[52] U.S. Cl. .................................. 282/27.5; 428/524; 428/531; 525/491
[58] Field of Search ............... 282/27.5; 428/306, 307, 428/511, 530, 531, 537, 524; 260/25, 19 R, 29.3; 525/472, 491

[56] References Cited

U.S. PATENT DOCUMENTS

| | | | |
|---|---|---|---|
| 2,052,093 | 8/1936 | Honel ..................................... | 260/25 |
| 3,398,107 | 8/1968 | Rowe et al. ........................ | 260/19 R |
| 3,540,909 | 11/1970 | Lin ..................................... | 428/306 X |
| 3,743,619 | 7/1973 | Kooguchi et al. ................. | 260/29.3 |

*Primary Examiner*—Thomas J. Herbert, Jr.
*Attorney, Agent, or Firm*—Cushman, Darby & Cushman

[57] ABSTRACT

A resin prepared by acid-catalytic condensation of p-phenylphenol with formaldehyde in the presence of an alcohol having a boiling point of 70° C. or more is improved in solubility in various solvents, especially in ethyl acetate, polyethylene glycol and oil, and is useful as an acidic substance in No Carbon copying paper, which gives an intense color with higher speed, especially in the form of spot ink in flexographic printing or gravure printing.

12 Claims, No Drawings

PROCESS FOR PRODUCTING P-PHENYLPHENOL RESIN IMPROVED IN SOLUBILITY AND NO CARBON COPYING PAPER COMPRISING THE SAME

This is a continuation, of application Ser. No. 799,777 filed May 23, 1977, now abandoned.

This invention relates to a process for producing a p-phenylphenol resin improved in solubility and to a color-forming sheet comprising the same for use in No Carbon copying papers.

A No Carbon copying paper is constructed of a combination of sheets; one of the sheets is coated with a microcapsule of which content is a solution of a color-formable basic dye, colorless under usual conditions, in an oil, and the other of the sheets is coated with an acidic substance (color-forming sheet). When a pressure is applied to the sheets, the microcapsule ruptures and the dye contacts with the acidic substance, whereupon a color is formed on the color-forming sheet responding to the pressure applied. Recently, the use of this type of copying papers are increasing particularly in the field of general copying chits.

Hitherto, activated clay has been employed as said acidic substance. However, a synthetic phenolic resin has recently been developed therefor and is replacing for the activated clay due to its more intense color. Phenolic resin has another great advantage over activated clay in that spot inks can be made by dissolving it into organic solvents, and applied to paper by a printing process.

A variety of phenolic resins have so far been studied, among which p-phenylphenol resin (hereinafter abbreviated to PPP resin) is most extensively used because of high color intensity. Although it can form an intense color, it is poorly soluble in most solvents. The solvents usable for PPP resin are limited to a few kinds of ketonic solvents such as methyl ethyl ketone, acetone and the like. Accordingly, when it is used in the form of solution in such solvents, for example, in case of the use for flexographic gravure printing, there arise a number of difficulties due to the use of ketonic solvents. That is, the ink thus prepared has an intense odor, and solvents might break the capsules including dyes.

It is the object of this invention to provide a PPP resin having an improved solubility. The improvement enables to obtain a color-forming sheet which exhibits an excellent color-forming ability when used as an element of No Carbon type of pressure sensitive copying papers. The improvement also enables to obtain an excellent spot ink having a high stability.

According to the invention, there is provided a process for producing a p-phenylphenol resin which comprises reacting p-phenylphenol or a mixture of 100 parts by weight of p-phenylphenol and 30 parts by weight or less of at least one member of the other substituted phenol with formaldehyde or a compound capable of forming formaldehyde in the presence of an acidic catalyst and a monohydric alcohol having a boiling point of 80°-170° C. at a pH value of 1.9 or lower.

Examples of the substituted phenol other than p-phenylphenol usable in this invention include $C_1-C_9$ alkyl or cycloalkyl-substituted phenols such as p-cresol, p-tert-butylphenol, p-amylphenol, p-cyclohexylphenol, p-heptylphenol p-octylphenol, p-cumylphenol, p-nonylphenol and the like; and halogenated phenols such as p-chlorophenol, p-bromophenol and the like. All these substituted phenols may be used either alone or in the form of a mixture of two or more members. They can be used in a proportion of 30 parts or less per 100 parts of p-phenylphenol. If the proportion of said substituted phenol other than p-phenylphenol exceeds the above-mentioned range, the resulting phenolic resin becomes poor in color-forming ability and unsuitable for use as an element of No Carbon copying paper.

As the formaldehyde source, aqueous solution of formaldehyde, paraformaldehyde and other compounds capable of generating formaldehyde are used.

The PPP resin of this invention is produced by a reaction carried out in the presence of an acidic catalyst. The catalysts usable include the commonly employed acidic catalysts such as hydrochloric acid, phosphoric acid, oxalic acid, p-toluenesulfonic acid and the like. The molar ratio of formaldehyde to phenolic compound is in the range of 0.3 to 1.0 mole per one mole of the phenolic compound. At the time of reaction, pH value of the reaction mixture should be kept at 1.9 or less. The reaction is carried out in the presence of a monohydric alcohol. The monohydric alcohols usable in this invention are those having a boiling point of 80°-170° C., and they are used in an amount of 10 to 200 parts by weight per 100 parts by weight of the phenolic compound. Concrete examples of said monohydric alcohol include n-propyl alcohol, isopropyl alcohol, n-butyl alcohol, tert-butyl alcohol, isobutyl alcohol, n-amyl alcohol, isoamyl alcohol, hexyl alcohol and the like. All these monohydric alcohols may be used either alone or in the form of a mixture of two or more members. Methanol and ethanol cannot be used in this invention. The reaction is carried out at a temperature equal to or lower than the boiling point of the system. A small quantity (at most 20%) of toluene, xylene or the like or an alcohol miscible with water may be incorporated into the aforesaid higher alcohols for the purpose of controlling the reaction temperature or reducing the viscosity or some others.

Melting point of the resulting resin is dependent upon reaction time and other reaction conditions. From the practical point of view, the resin preferably has a melting point not lower than 70° C., so far as used in the form of an aqueous coating fluid. If the resin is to be dissolved into a solvent and used as an ink, it may be liquid at ordinary temperature.

The first characteristic feature of the resin of this invention is that, when used as an element of color-forming sheet for No Carbon copying paper, it can form a color with a higher speed as compared with the hitherto disclosed PPP resins. This is probably due to its excellent solubility into the oil present in the microcapsule. The second characteristic feature of the resin of this invention is that, when formed into an ink, it exhibits excellent solubilities in various solvents enough to enhance the stability of the resulting ink. This invention enables to produce a PPP resin soluble in ethyl acetate, and therefore the ketonic solvents such as methyl ethyl ketone or acetone which have hitherto been employed in the production of spot inks for flexographic gravure printing can be replaced with ethyl acetate. The replacement is valuable, in the first place, in making the odor of the ink more pleasant. The replacement is valuable, in the second place, in that ethyl acetate is less destructive to microcapsules. The latter character of ethyl acetate greatly eliminates the danger of injuring microcapsule in the course of printing. This is its marked advantage over ketonic solvents which are much more destructive to microcapsules and unsuitable for use as a component of ink for No Carbon paper. When used in the production of inks, the PPP resin should have a solubility not lower than 40%. The resin also shows an excellent solubility in polyethylene glycols (ethylene glycol ethers), owing to which it can be employed for producing letterpress printing inks of high stability.

The reason why the resin of this invention exhibits the above-mentioned desirable properties is not yet fully known. However, it is probably due to that molecular weight distribution of the resin is fit for such high color-forming ability and high solubility and that the resin is partially modified possibly by ether bond formation with the monohydric alcohol.

Referring to the following examples, this invention will be illustrated more concretely.

EXAMPLE 1

A mixture of 500 g of p-phenylphenol, 115 g of 37% formaldehyde solution, 250 g of isobutyl alcohol and 1.5 cc of hydrochloric acid was placed in a four-necked flask of one liter capacity equipped with a thermometer, a cooler and a stirrer. At this time, the mixture had a pH value of 0.5. With stirring it was reacted for 5 hours under reflux at 95°–100° C., after which the reaction mixture was concentrated, dehydrated and heated up to a temperature of 150° C. Thus, a white-colored resin having a melting point of 100° C. was obtained.

EXAMPLE 2

In the same apparatus as mentioned in Example 1, a mixture of 500 g of p-phenylphenol, 120 g of 37% formaldehyde solution, 5 g of oxalic acid and 200 g of n-butanol, having an initial pH value of 1.0, was reacted for 5 hours at 98°–100° C. Then, the reaction mixture was concentrated and dehydrated by heating it up to 135° C. The resin thus obtained had a melting point of 110° C. and an average molecular weight of about 300.

EXAMPLE 3

By repeating the procedure of Example 1, a mixture of 450 g of p-phenylphenol, 50 g of p-tert-butylphenol, 300 g of n-butanol, 170 g of formaldehyde solution and 10 g of oxalic acid, having an initial pH value of 1.0, was reacted to give a light brown-colored resin having a melting point of 80° C.

EXAMPLE 4

By repeating the procedure of Example 1, a mixture of 500 g of p-phenylphenol, 160 g of 37% formaldehyde solution, 5 g of oxalic acid and 200 g of isoamyl alcohol, having an initial pH value of 1.0, was reacted for 5 hours at 98°–100° C., after which the reaction mixture was heated up to a temperature of 135° C. The resin thus obtained had a melting point of 75° C. and an average molecular weight of about 400.

COMPARATIVE EXAMPLE 1

The procedure of Example 2 was repeated, except that the 200 g of n-butanol was replaced by a mixture of 200 g of methanol and 100 g of water and the reaction mixture was heated for 5 hours under reflux at 77°–81° C. and thereafter heated up to a temperature of 135° C. The resin thus obtained had a melting point of 165° C.

COMPARATIVE EXAMPLE 2

By repeating the procedure of Example 1, a mixture of 500 g of p-phenylphenol, 55 g of 80% formaldehyde, 2.5 g of p-toluenesulfonic acid and 200 g of xylene was reacted to give a light brown-colored transparent resin having a melting point of 73° C.

EXAMPLE 5

A mixture of 100 g of the resin of Example 1, 200 g of water and 0.3 g of sodium silicate was pulverized in a ball mill until the particle size reached 5μ or under. 30 Grams of the dispersion thus obtained was mixed with 200 g of water, 30 g of kaolinite, 25 g of oxidized starch (10% aqueous solution) and 5 g of Dowlatex 620 (S. B. R. latex manufactured by Dow Chemicals Co.). The resulting mixture was applied to a high quality paper (Mitsubishi Diaform) so as to give a coating weight of about 5 g. Thus, there was obtained a take-up sheet for No Carbon paper having an excellent color-forming property.

COMPARATIVE EXAMPLE 3

The procedure of Example 5 was repeated, except that the resin of Example 1 was replaced by the reaction product of Comparative Example 1. After being coated, the paper hardly exhibited color-forming property. A glistening crystalline powdery material was observed on the surface of the paper. These facts suggested that the major part of the reaction product of Comparative Example 1 was the unreacted materials themselves.

EXAMPLE 6

A spot ink for flexographic gravure printing was prepared by dispersing and pulverizing 30 parts by weight of titanium oxide in a ball mill for 8 hours together with a solution of 40 parts by weight of the resin of Example 2 in 60 parts by weight of ethyl acetate and a solution of 5 parts by weight of maleic acid resin (Malkeed No. 32 manufactured by Arakawa Rinsan Co.) in 5 parts by weight of ethyl acetate. The ink was printed to a transfer paper (Mitsubishi-NCR high-grade paper N-40) by means of a flexographic printing machine (manufactured by Miyakoshi Co.). Thus, there was obtained a spot-printed intermediate sheet of excellent quality.

COMPARATIVE EXAMPLE 4

The procedure of Example 6 was repeated, except that the resin of Example 2 was replaced by Hitanol X 712 (p-phenylphenol resin manufactured by Hitachi Chemical Co., Ltd.). However, the resin, Hitanol X 712 could not be formed into an ink because of its poor solubility in ethyl acetate. Thus, a spot ink was prepared by employing methyl ethyl ketone instead of ethyl acetate. When the ink thus obtained was used for the same flexographic printing as in Example 6, a blue-colored fogging took place in the spot-printed part. As compared with the printed product of Example 6, the printed product of this Comparative Example was lower in both color-forming velocity and intensity of the color formed.

EXAMPLE 7

A typographic spot ink was prepared by dissolving 100 parts by weight of the resin of Example 4 into 100 parts by weight of P. E. G. 400 (polyethylene glycol), mixing the resulting solution with 100 parts of titanium oxide and kneading the resulting mixture by means of a triple roll mill. The ink thus obtained was printed to a high-quality paper by rubber plate letterpress printing process by the use of conventional letterpress printing machine (manufactured by Akira Seisakusho). Thus, there was obtained a take-up sheet for No Carbon copying paper having excellent properties.

COMPARATIVE EXAMPLE 5

An ink was prepared by repeating the procedure of Example 7, except that the resin of Example 4 was replaced by the resin of Comparative Example 2. However, no ink of good quality was obtained because the used resin deposited due to its poor solubility in P. E. G. 400. Though the ink was tentatively used in the same printing process as mentioned in Example 7, it was impossible to obtain any good print. The printed produce of this Comparative Example was inferior to that of Example 7 in both color-forming velocity and intensity of the color formed.

EXAMPLE 8

An ink was prepared by repeating the procedure of Example 7, except that 100 parts of the resin of Example 3 was dissolved into 100 parts of T. E. G. (triethylene glycol) and the resulting solution was mixed with 90 parts of zinc oxide and 10 parts of silica.

The ink thus obtained was printed to a commercially available paper (Mitsubishi-NCR high-grade paper N-80) by the use of a dry offset printing machine. Thus, there was obtained a spot-printed intermediate sheet having excellent color-forming properties.

What is claimed is:

1. A color-forming sheet for no carbon copying paper having a coating film containing the p-phenylphenol resin obtained by a process which comprises reacting at a pH value not higher than 1.9 p-phenylphenol itself or a mixture of 100 parts by weight of p-phenhlphenol and 30 parts by weight or less of other substituted phenol with a formaldehyde or a compound capable of forming formaldehyde in the presence of an acidic catalyst and a monohydric alcohol having a boiling point of 80°–170° C. in an amount of 10 to 200 parts by weight based on 100 parts by weight of the p-phenylphenol or the mixture and removing the alcohol, wherein said p-phenylphenol resin is soluble in ethyl acetate and polyethylene glycol.

2. A color-forming sheet according to claim 1, wherein said coating film is prepared by a process of aqueous coating.

3. A color-forming sheet according to claim 1, wherein said coating film is prepared by a process of letterpress printing employing a solvent highly composed of ethyl acetate or polyethylene glycol.

4. A color-forming sheet according to claim 1, wherein 1-phenylphenol itself alone is reacted with formaldehyde or a compound capable of forming formaldehyde.

5. A color-forming sheet according to claim 1, wherein said monohydric alcohol is selected from the group consisting of n-propanol, iso-propanol, n-butanol, iso-butanol, n-amyl alcohol, iso-amyl alcohol and hexyl alcohol.

6. A color-forming sheet according to claim 1 wherein there is employed p-phenylphenol together with said other substituted phenol, said other substituted phenol being a $C_1$–$C_9$ alkyl or cycloalkyl substituted phenol or a halogenated phenol.

7. A color-forming sheet according to claim 1 wherein the ratio of formaldehyde or compound capable of forming formaldehyde to total of p-phenylphenol or mixture of p-phenylphenol and said other substituted phenol is 0.3 to 1.0 mole:1 mole.

8. A color-forming sheet according to claim 1 wherein the reactants consist essentially of the p-phenylphenol alone or in admixture with said other substituted phenol and formaldehyde or said compound capable of forming formaldehyde, and said alcohol.

9. A color-forming sheet according to claim 1, wherein said coating film is prepared by a process of flexographic printing or gravure printing employing a solvent mainly composed of ethyl acetate or polyethylene glycol.

10. A color-forming sheet according to claim 9, wherein said flexographic printing process or gravure printing process is practised by the use of a solvent mainly composed of ethyl acetate.

11. A color-forming sheet according to claim 1, wherein there is employed p-phenylphenol together with said other substituted phenol, said other substituted phenol being a $C_1$–$C_9$ alkyl or cycloalkyl-substituted phenol.

12. A color-forming sheet according to claim 11, wherein said $C_1$–$C_9$ alkyl-substituted phenol is p-tert-butyl-phenol.

* * * * *